United States Patent
Sumihiro et al.

[19]

[11] Patent Number: 6,008,850
[45] Date of Patent: Dec. 28, 1999

[54] MOVING PICTURE DECODING DEVICE

[75] Inventors: Hiroshi Sumihiro; Hideki Koyanagi, both of Kanagawa; Seiichi Emoto, Tokyo; Tohru Wada, Kanagawa, all of Japan

[73] Assignee: Sony Corporation, Tokyo, Japan

[21] Appl. No.: 08/168,087

[22] Filed: Dec. 14, 1993

[30] Foreign Application Priority Data

Dec. 15, 1992 [JP] Japan .................................... 4-334768

[51] Int. Cl.[6] .................................................... H04N 7/32
[52] U.S. Cl. .......................... 348/416; 348/699; 348/714
[58] Field of Search .................................. 348/402, 403, 348/405, 409, 412, 413, 416, 426, 567, 699, 714; H04N 7/133, 7/137, 7/32

[56] References Cited

U.S. PATENT DOCUMENTS

| | | | |
|---|---|---|---|
| 4,967,397 | 10/1990 | Walek | 365/222 |
| 4,991,013 | 2/1991 | Kobayashi | 348/567 |
| 5,195,182 | 3/1993 | Sasson | 348/714 |
| 5,247,355 | 9/1993 | Frederiksen | 348/416 |
| 5,267,334 | 11/1993 | Normille et al. | 348/409 |
| 5,315,388 | 5/1994 | Shen et al. | 348/402 |
| 5,353,063 | 10/1994 | Yagisawa et al. | 348/426 |

FOREIGN PATENT DOCUMENTS

| | | | |
|---|---|---|---|
| 0 510 975 | 10/1992 | European Pat. Off. | H04N 7/137 |
| 0 503 956 | 9/1993 | European Pat. Off. | H04N 7/13 |

OTHER PUBLICATIONS

B. Prince, et al., A New Era of Fast Dynamic RAMs, IEEE Spectrum, vol. 29, No. 10, (Oct. 1992), pp. 43–49.

*Primary Examiner*—Richard Lee
*Attorney, Agent, or Firm*—Limbach & Limbach L.L.P.

[57] ABSTRACT

The horizontal address and the vertical address of a picture image are arrayed at the lower and upper order sides, respectively, and allocated to a lower order side column address and an upper order side column address of the synchronous DRAM employed as a picture memory, respectively. A bank switching address is allocated between the upper most bit of the horizontal address and the lower most bit of the row address to enable data to be read continuously to achieve high-speed accessing and improve the utilization efficiency of the data bus.

8 Claims, 16 Drawing Sheets

COLUMN ADDRESS →

|  | C0 | C1 | C2 | C3 | C4 | C5 | C6 | C7 |
|---|---|---|---|---|---|---|---|---|
| R0 | D00 | D10 | D20 | D30 | D40 | D50 | D60 | D70 |
| R1 | D01 | D11 | D21 | D31 | D41 |  |  |  |
| R2 |  |  |  |  |  |  |  |  |
| R3 |  |  |  |  |  |  |  |  |
| R4 |  |  |  |  |  |  |  |  |
| R5 |  |  |  |  |  |  |  |  |
| R6 |  |  |  |  |  |  |  |  |
| R7 |  |  |  |  |  |  |  |  |

ROW ADDRESS ↓

**FIG.2
(PRIOR ART)**

MOVING PICTURE DECODING DEVICE

BACKGROUND OF THE INVENTION

1. Field of the Invention

This invention relates to a moving picture decoding device for reading picture data from a picture memory responsive to a motion vector for decoding the moving picture.

2. Description of the Related Art

There are a variety of systems for compressing and encoding moving picture signals, such as television telephone or television conference signals or telecast signals. Recently, a hybrid encoding system, such as MC-DCT, which consists in a combination of a so-called motion compensated (MC) inter-frame prediction and discrete cosine transform (DCT), is thought to be promising.

FIG. 1 shows a circuit for an encoding device conforming to the above-mentioned MC-DCT hybrid system. In this figure, moving picture signals, such as television signals, are supplied as input signals to an input terminal 111. These input signals are supplied to a motion detection circuit 113 and a subtractive node 114 via a picture memory 112 employed as a frame memory. An output of the subtractive node 114 is transmitted to a DCT circuit 115 for discrete cosine transformation and thence supplied to a quantizer 116 for quantization before being supplied to a series circuit consisting of a inverse quantization unit 117 and an inverse DCT (IDCT) circuit 118 as a local decoder. An output of the IDCT circuit 118 is supplied via an additive node 119 to a picture memory 120 employed as a frame memory. An output read from the picture memorv 120 is transmitted to the motion detection circuit 113 and to a motion compensation circuit 121. The motion detection information such as the motion vector from the motion detection circuit 113 is transmitted to the motion compensation circuit 121 and to a variable length coding circuit 123. An output of the motion compensation circuit 121 is supplied to the subtractive node 114 and to the additive node 119.

It is noted that the input signals are stored temporarily in the picture memory 112 and subsequently read out and processed on the basis of a block of a pre-set size. The motion detection circuit 113 compares the values of pixels of a signal block from the picture memory 112 to the values of pixels of locally decoded signals from the picture memory 120 for detecting the motion vector. The motion compensation circuit 121 outputs a reference block to the subtractive node 114 based on this motion vector. The subtractive node 114 outputs a difference between the input signal block and the reference block. The difference output is discrete cosine transformed by the DCT circuit 115 and quantized by the quantizer 116 before being supplied to the variable length coding unit 123 such as an entropy coding unit for variable length coding. The motion vector from the motion detection circuit 113 is also supplied to the variable length coding unit 123.

An output of the variable length coding unit 123 is supplied to a transmitting buffer memory 125 where the coded data to be transmitted is stored transiently. These coded data are supplied to the quantizer 116 and to the variable length coding unit 123. In this manner, the operation of quantization and variable length coding is carried out by the quantizer 116 and the variable length coding unit 123 so that the amount of transmitted data per unit time will be constant. The coded data, which is caused to be transmitted in a constant quantity per unit time, is transmitted over a communication network via an output terminal 126 or recorded or reproduced on or from a recording medium.

In decoding the signals, processed with the above-described MC-DCT hybrid coding operations, by the local decoder within the encoder or within the moving picture device, it is necessary to read out data of a frame directly preceding the current frame from the frame memory depending on the motion vector to perform motion compensation thereon.

The frame memory is made up of a number of memory elements, such as DRAMs, and is adapted for reading out data from the memory elements by parallel reading with four bytes, as an example, as a word, at a rate of one byte from each memory element. Consequently, in decoding the signals coded in accordance with the above-described MC-DCT hybrid coding, by way of picture decoding, it is necessary to have a high-speed access to the frame memory.

However, if a DRAM shown in FIG. 2, in which access to the data is had by row and column addresses, is employed as a frame memory, it has been impossible to read out data continuously.

An illustrative method for reading out data from this DRAM is explained with reference to a timing chart of FIG. 3. In this figure, "CLK" denotes clock pulses. "/CS" denotes a logical signal to be supplied to an L-active chip select terminal and its timing. "/RAS" denotes a logical signal to be supplied to a random access terminal for a row which is L-active and its timing. "/CAS" denotes a logical signal to be supplied to a random access terminal for a column which is L-active. "/WE" (not shown in FIG. 3) denotes aolgical signal to be supplied to a write enable terminal which is L-active and its timing. "Add" denotes the state of the setting line for the row and column addresses. "Out" denotes a readout data output. More precisely, the logical signal of chip select (CS) is L-active, so that it is expressed as "/CS". Similarly, the row and column addresses are also L-active, so that they are expressed as "/RAS" and "/CAS", respectively. The logical signal of write enable is also L-active, so that it is expressed as "/WE". The setting line for the row and column addresses is "Add". The readout data output is "Out". When an L-level logical signal is applied as "/CS" and "/RAS", and an H-level logical signal is supplied as "/CAS", "Add" is set to a row address $R_0$. When an L-level logical signal is applied as the logical signals "/CS" and "/CAS", and an H-level logical signal is supplied to "/RAS", "Add" is set to a column address $C_o$. Data $D_{00}, D_{10} \ldots, D_{70}$ are then outputted as "Out" after the third clock after the setting of the column address $C_0$.

After outputting of a data $D_{70}$, an L-level logic signal is again applied to the terminals "/CS" and "/RAS", and an H-level logic signal is applied to the terminal "/CAS". At this time, the state "Add" is set to a row address $R_1$. Then, an L-level logic signal is applied to each of the terminals "/CS" and "/RAS", and an H-level logic signal is applied to the terminal "/RAS". At this time, the state "Add" is set to a column address $C_1$. Then, after the third clock after such setting of $C_1$, data $D_{01}, D_{11}, D_{21}, \ldots$ are outputted as "Out".

That is, if the DRAM is employed as the picture memory as described above, it becomes necessary to set the row address each time the row is changed, such that continuous data reading is not possible, that is data $D_{01}$ cannot be outputted after data $D_{70}$ without setting a time interval corresponding to five clocks.

OBJECT AND SUMMARY OF THE INVENTION

In view of the above-described status of the art, it is an object of the present invention to provide a motion picture decoding device in which a synchronous DRAM is employed as a picture memory to enable continuous data readout and hence high speed memory accessing.

According to the present invention, there is provided a moving picture decoding device for decoding a moving picture by writing or reading picture data to or from a picture memory, wherein a synchronous DRAM is employed as the picture memory. The synchronous DRAM has a plurality of banks, each of which is accessed by a common column address and a common row address and designated by a bank switching address.

When the horizontal addresses and the vertical addresses of the picture image are arrayed at the lower and upper order sides, respectively, and allocated to lower order side column addresses and upper order side column addresses of the synchronous DRAM employed as the picture memory, respectively, the bank switching address may be allocated between the upper most bit of the horizontal address and the lower most bit of the row address.

When the horizontal address and the vertical address of the picture image are arrayed at the lower and upper order sides, respectively, and allocated to lower order side column addresses and upper order side column addresses of the synchronous DRAM employed as the picture memory, respectively, the bank switching address may be allocated between the column address and the row address.

When the horizontal address and the vertical address of the picture image are arrayed at the lower and upper order sides, respectively, and allocated to lower order side column addresses and upper order side column addresses of the synchronous DRAM employed as the picture memory, respectively, the bank switching address may be allocated to the lower most bit of the vertical address.

With the moving picture decoding device of the present invention, the synchronous DRAM having a plurality of banks each of which is accessed by common row and column addresses and designated by the bank switching address is employed as the picture memory, and address allocation is so made that the bank switching address bit is allocated so as to be at the lower order side than at least the row address and at the higher order side than the horizontal address of the picture image. The result is that data may be read continuously to achieve high-speed accessing and improved efficiency in the utilization of the data bus.

Other objects and advantages of the present invention will become apparent from the following description of the preferred embodiments and the claims.

BRIEF DESCRIPTION OF THE DRAWINGS

FIG. 2 illustrates data readout when employing a DRAM for the picture memory.

DESCRIPTION OF THE PREFERRED EMBODIMENTS

Illustrative embodiments of the moving picture decoding device according to the present invention will be explained with reference to FIGS. 4 to 16.

Figure 1:
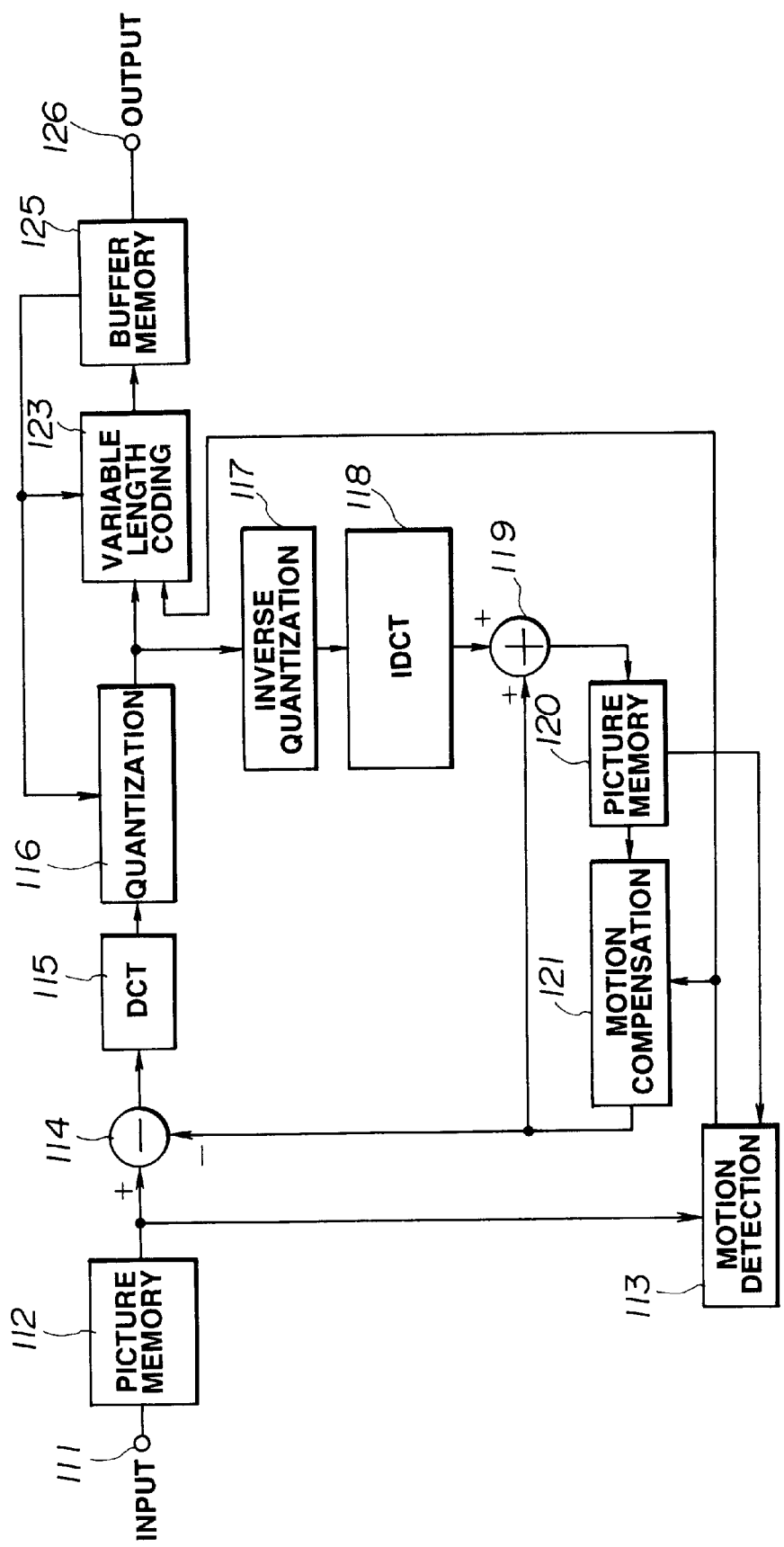
FIG. 1 is a block circuit diagram showing an example of a basic arrangement of a MC-DCT hybrid encoding device.
Figure 3:
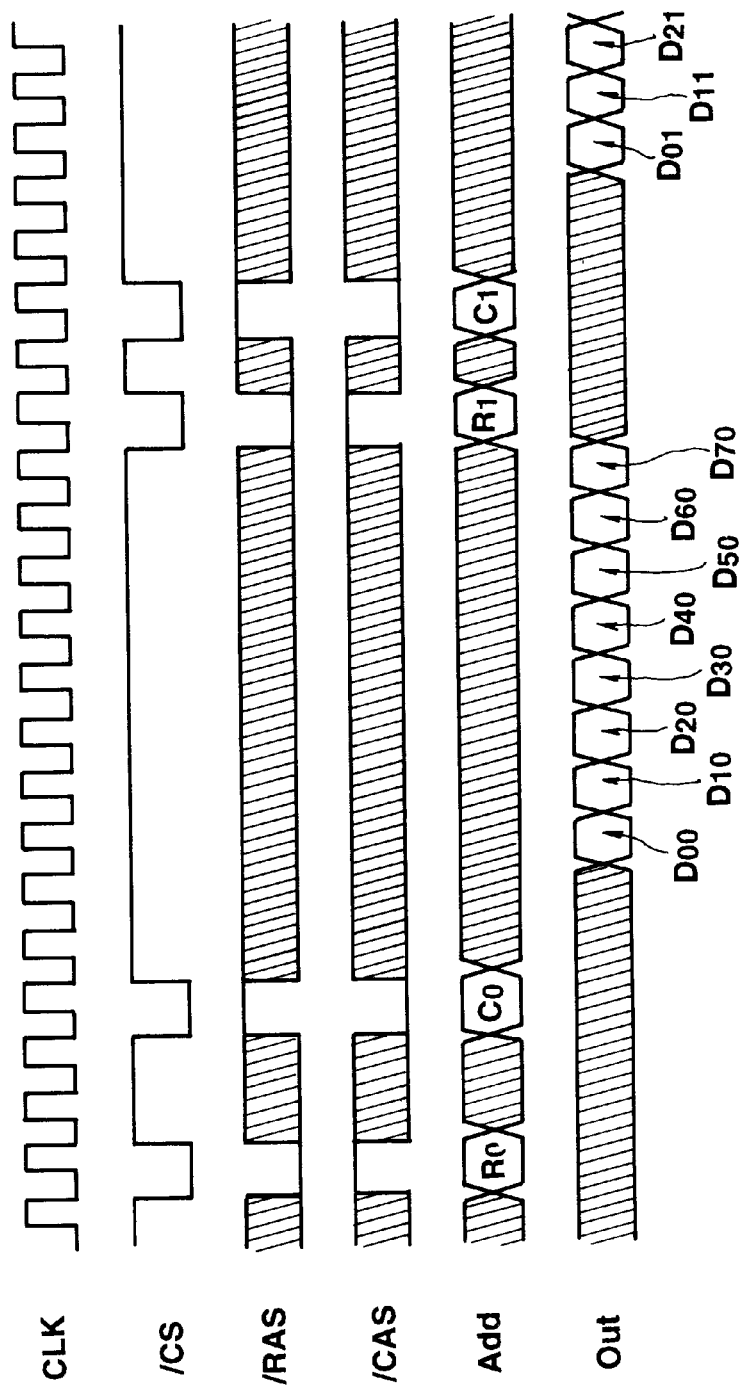
FIG. 3 is a timing chart for illustrating data readout from the DRAM.
Figure 4:
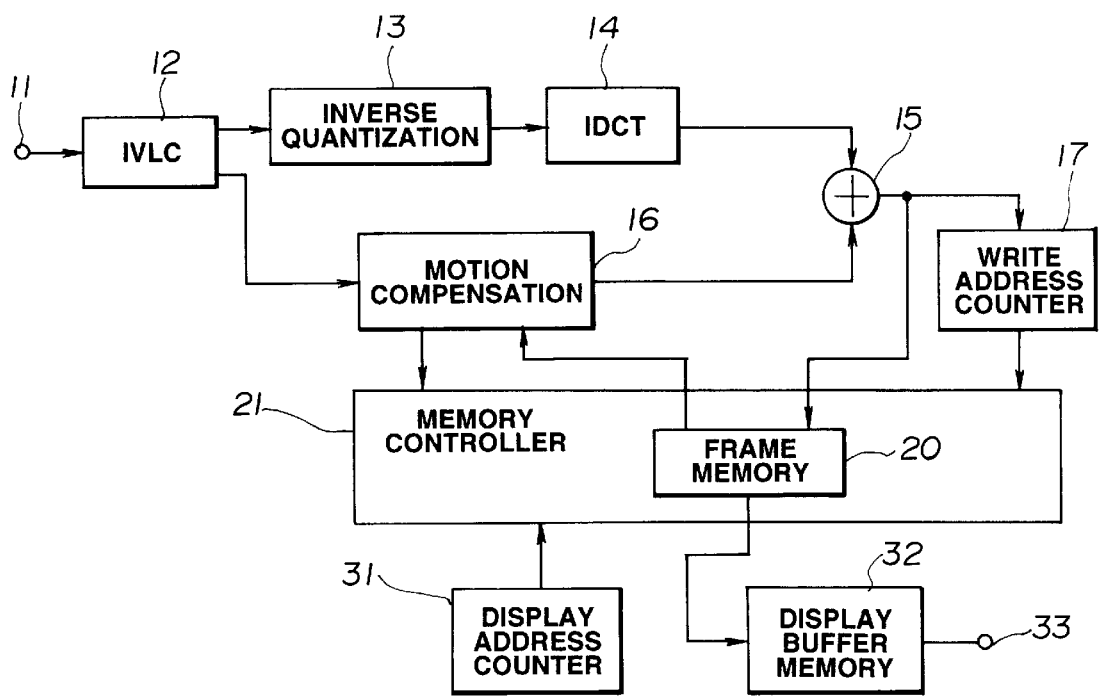
FIG. 4 is a block circuit diagram showing an arrangement of a moving picture decoding device according to the present invention.

To an input terminal 11 of the present embodiment, shown in a block circuit diagram of FIG. 4, there is supplied a data string signal or so-called bit stream which has been encoded in accordance with e.g. the above-described MC-DCT encoding method. The input signal is also supplied to an inverse variable length coding or decoding circuit (IVLC) 12 for inverse variable length decoding for generating compressed data and motion vector data for motion compensation.

The compressed data from the IVLC circuit 12 is transmitted to an inverse quantization circuit 13 for inverse quantization. The inverse-quantized data is supplied to an inverse DCT circuit 14 for an inverse DCT operation, that is an operation which is the reverse of the DCT operation, so as to be supplied to an additive node 15. The motion-compensated vector data from the IVLC circuit 12 is supplied to a motion compensation circuit 16 from which a readout address for the motion compensation block based on the motion compensation vector is supplied to a memory controller 21 of a frame memory 20 as a picture memory. Data of the motion compensation block is read from the frame memory 20 in accordance with the readout address and transmitted to the motion compensation circuit 16. The motion-compensated picture data from the motion compensation circuit 16 is supplied to the additive node 15.

Addition output data from the additive node 15 is supplied to the frame memory 20 so as to be written in the locations designated by the addresses supplied from a write address counter 17. The write address counter 17 is supplied with the output data from the additive node 15 and counts up each time the addition output data is outputted from the additive node 15.

The picture data written in the frame memory 20 is read out in accordance with the addresses transmitted from a display address counter 31 to the memory control unit 21, and is outputted at an output terminal 33 via a display buffer memory 32. It is noted that the present embodiment is designed to accelerate data readout of a motion compensation block from the frame memory 20 in accordance with the readout address of the motion compensation block based on the motion compensation vector transmitted from the motion compensation circuit 16 to the memory control unit 21.

To this end, the frame memory 20 is a synchronous DRAM having plural banks each of which is accessed by common column and row addresses and each of which is designated by a bank changeover address. The basic function of the synchronous DRAM, referred to herein as SDRAM, is explained in "NIKKEI ELECTRONICS", pages 143 to 147, No. 553, issued on May 11, 1992.

An example of the SDRAM previously proposed is the HM 5216810120 series by HITACHI CO. LTD. This SDRAM latches control signals and data in synchronism with external clocks of 66 to 100 MHz, thereby facilitating the designing of the signal timing. The SDRAM may be accessed with the cycle time of 10 to 15 ns by inputting and outputting of data of contiguous addresses (burst transfer). With the SDRAM, the memory cell array in the chip is divided into plural banks. Interleaving renders it possible to achieve continuous addressing even if row addresses are different. Besides, with this SDRAM, the data outputting sequence may be changed during the burst transfer. However, if different rows in the same bank are accessed, data outputting is interrupted, as explained subsequently.

Figure 5:
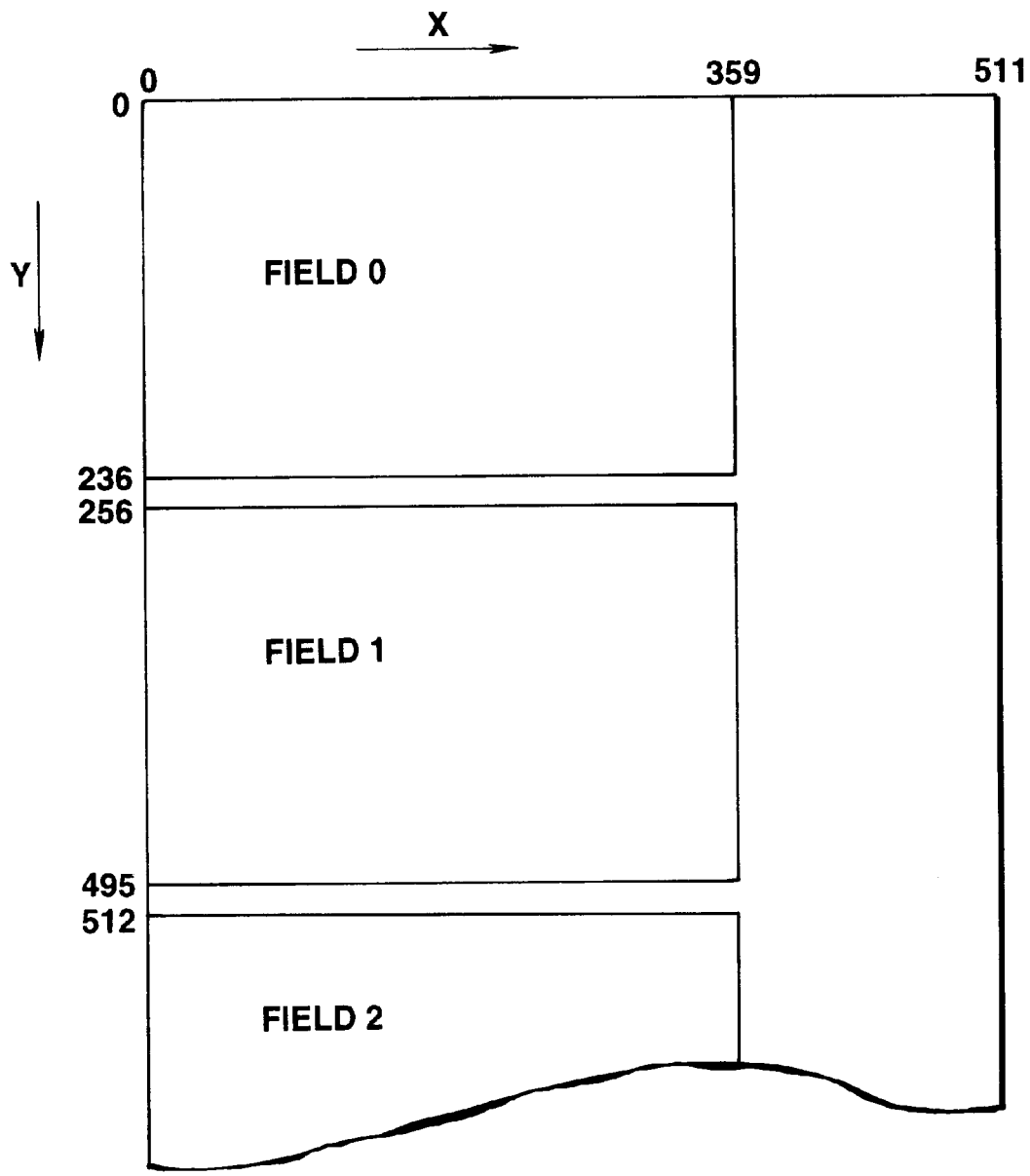
FIG. 5 illustrates a picture image of a synchronous DRAM.
Figure 6:
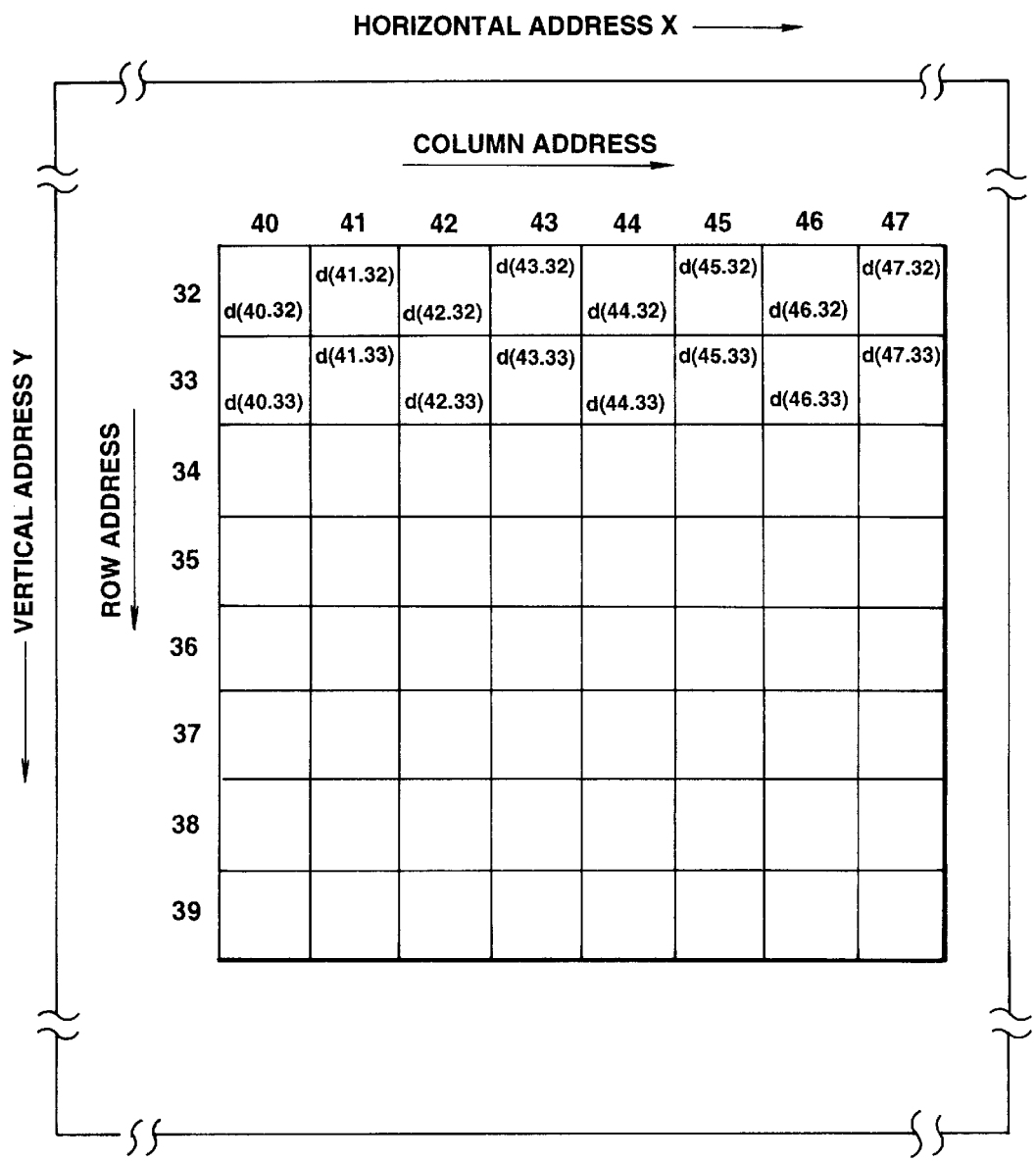
FIG. 6 illustrates a data block of a 8×8 size in terms of coordinate values of the picture image.
Figure 7:
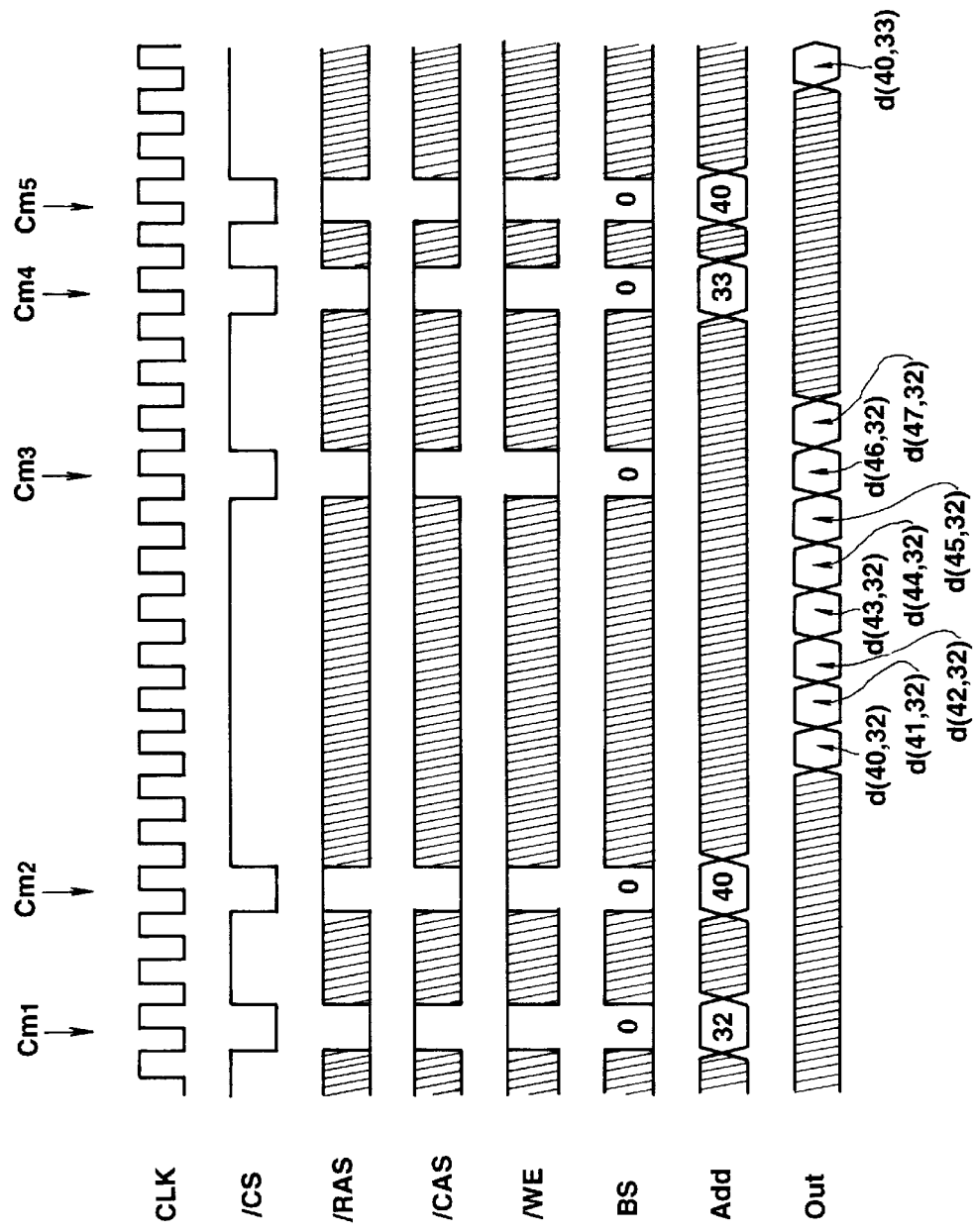
FIG. 7 is a timing chart for illustrating the basic function of the SDRAM.

Referring to FIGS. 6 and 7, picture data readout is explained for the case in which 8×8 motion compensation (MC), for example, is to be performed in 1048576 words×8 bits×2 banks, with a 360×240 field, a picture image of which is shown in FIG. 5. Meanwhile, it is assumed that only one bank (bank 0) is employed.

If, when reading out 8×8 size data from a coordinate location (40, 32) of the picture image, as shown in FIG. 6, a data length continuously accessed in advance with the burst transfer mode, called a burst length or a lap length, is set to 8, as an example, data up to the column address "47" may be outputted by simply setting the row address "32" and the column address "40" without the necessity of subsequent setting of the column addresses. That is, readout data d(40, 32), d(41, 32), d(42, 32), d(47, 32) may be outputted by simply setting the row address "32" and the column address "40".

FIG. 7 illustrates the above example by a timing chart. The bank employed herein is only the bank 0, as mentioned above. In FIG. 7, "CLK" denotes clock pulses having the frequency of 100 MHz. The logical signal of chip select (CS) is L-active and hence designated by "/CS". The logical signal of chip select (CS) is L-active, so that it is expressed as "/CS". Similarly, the row and column addresses are also L-active, so that they are expressed as "/RAS" and "/CAS", respectively. The logical signal of write enable is also L-active, so that it is expressed as "/WE". The bank changeover address is "BS". The setting line for the row and column addresses is "Add". The readout data output is "Out".

Referring to FIG. 7, if L-level logical signals are supplied as "/CS" and "/RAS", an H-level logical signal is supplied as "/CAS", an H-level logical signal is supplied to "/WE" and "0" is supplied as "BS", a command $C_{M1}$ is issued for activating the bank 0 of the SDRAM of the chip selected by "/CS". At this time, the row address is set to "32" by "Add".

If an L-level logical signal is supplied as "/CS", an H-level logical signal is supplied as "/RAS", an L-level logical signal is supplied as "/CAS" and an H-level logical signal is supplied to "/WE" and "0" is supplied as "BS", a command $C_{M2}$ is issued causing data to be read out from the bank 0 of the SDRAM of the chip selected by "/CS". At this time, the column address is set to "40" by "Add".

Then, "Out" causes eight readout data pulses to be outputted after the sixth clock from the setting of the row address (command $C_{M1}$). The reason the eight data pulses are outputted is that the burst length of continuous accessing during the burst transfer mode is pre-set to eight by the register.

If L-level logical signals are supplied as "/CS" and "/RAS", an H-level logical signal is supplied as "/CAS" and an L-level logical signal is supplied as "/WE", and "BS" is set to "0", a command $C_{M3}$ is issued which renders the next readout effective. This command $C_{M3}$ is called a precharge command which causes a necessary operation to be performed when accessing a row in a given bank after having accessed some different row in the same bank.

If, for changing the row, L-level logical signals are supplied as "/CS" and "/RAS", an H-level logical signal is supplied as "/CAS" and an H-level logical signal is supplied as "/WE", and "BS" is set to "0", as in the case of the command $C_{M1}$, a command $C_{M4}$ is issued activating the bank 0 of the SDRAM of the chip selected by "/CS". By this command, the row address is set to "33" by "Add".

An L-level logical signal is supplied as "/CS", an H-level logical signal is supplied as "/RAS", an L-level logical signal is supplied as "/CAS" and an H-level logical signal is supplied as "/WE", and "BS" is set to "0", as in the case of the command $C_{M2}$. Then, "BS" is set to "0" and a command $C_{M5}$ is issued to cause data of the bank 0 of the SDRAM of the chip selected by "/CS" to be read out. The column address is set to "40" by "Add".

Then, "Out" outputs eight readout data pulses after the fifth clock from the setting of the row address command $C_{M4}$. The reason the eight data pulses are outputted is that the burst length of continuous accessing during the burst transfer mode is pre-set to eight by the register. Meanwhile, readout data is outputted at the fifth and sixth clocks after the inputting of the row address. Since the clock frequency is 100 MHz, the cycle time is 10 ns and hence faster than the high-speed page mode of the DRAM (with the clock frequency of 20 MHz).

Thus, the SDRAM outputs data of contiguous addresses at a cycle of 50 to 60 ns by a set of e.g. eight clocks in a timed relation to the clocks of e.g. 100 MHz (corresponding to the period of 10 ns) by the setting of the continuous addresses. When accessing the same row in the SDRAM, continuous accessing may be had on the clock basis by controlling the input timing of the column address, even in cases where the column addresses are not consecutive. Continuous accessing may be had by changing the bank if the row addresses are changed. Consequently, high-speed data readout becomes possible if the SDRAM is applied to the picture memory. However, if the 50 or 60 ns cycle time after the outputting of eight consecutive data until the outputting of the next eight consecutive readout data is reduced or eliminated as mentioned above, the data readout speed may be improved further. That is, it suffices if the data output is not interrupted when switching is made from a given row to another row in the same bank.

In the present embodiment, interruption in the data outputting may be eliminated by such address allocation in which an SDRAM is employed as the frame memory 20 to take advantage of the features of the SDRAM that, when access is had to the same row, continuous accessing may be had on the clock basis even if the column addresses are not consecutive, if the inputting to the column address is controlled, and that, if the row address is changed, continuous accessing may be had by changing the banks.

Figure 8:
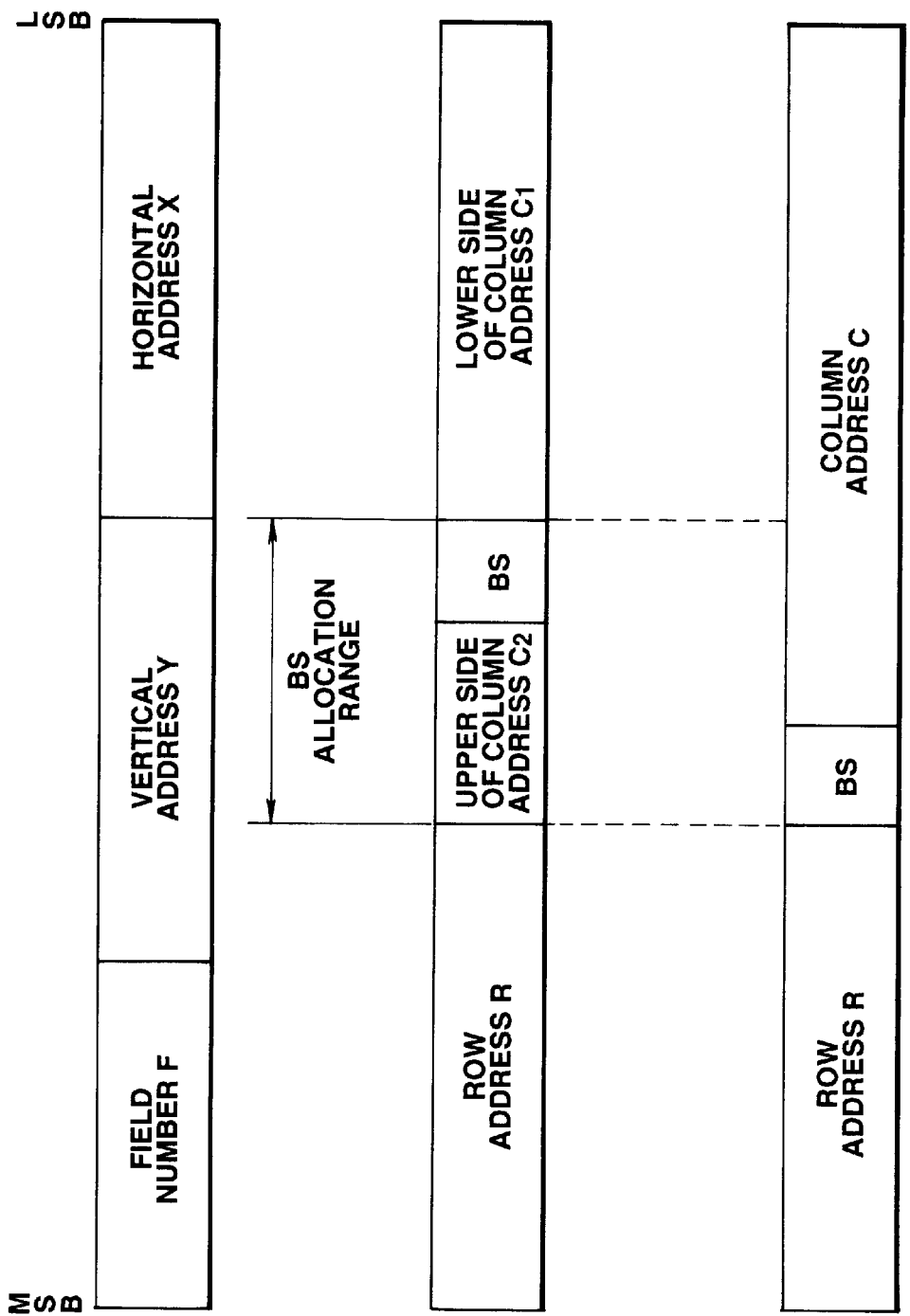
FIG. 8 illustrates the address allocation for the SDRAM employed in the present embodiment.

FIG. 8 illustrates the address allocation for the SDRAM employed in the present embodiment. When the horizontal address X and the vertical address Y of the picture image are arrayed on the lower order side (LSB side) and on the upper order side (MSB side), respectively, as shown in FIG. 8, and the horizontal address X and the vertical address Y are allocated to the lower order side column address C and the upper order side row address R of the SDRAN employed as the picture memory, the bank address switching bit BS is allocated within the ranges shown in FIG. 8. That is, the bank changeover address BS is located in a BS allocation range between the upper most bit of the horizontal address X and the lower most bit of the tow address R. The field number F shown in FIG. 5 is entered as shown in FIG. 8.

In the middle of FIG. 8, there is shown an example in which the bank switching address BS is positioned at the lower most order side within the range of the BS allocation. Thus the column address is divided into an upper order side address ($C_2$) and a lower order side address ($C_1$).

The bottom of FIG. 8 shows address allocation in which the bank switching address BS is positioned at the upper most order side within the BS allocation range. The address allocation shown is merely illustrative and any position may be selected if only the bank switching address bit BS is within the BS allocation range.

Figure 9:
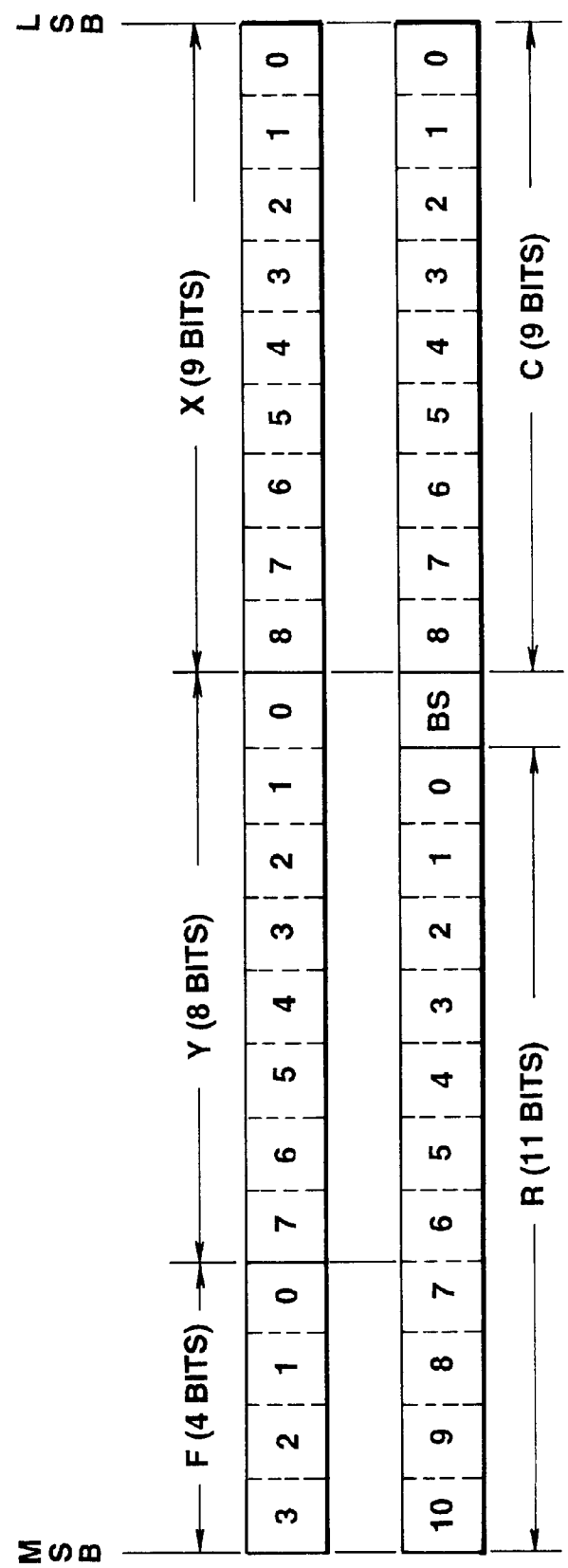
FIG. 9 shows a concrete example of address allocation shown in FIG. 8.

Referring to FIG. 9, illustrates readout of picture data in which the bank switching address bit is within the BS allocation range and the number of the column address C is coincident with that of the horizontal address X. In FIG. 9, the horizontal address X and the vertical address Y of the picture image are of 9 and 8 bits, respectively, the field number F is 4 bits, and the column address C, the row address R and the bank switching address BS are of 10, 11, and 1 bits, respectively.

Figure 10:
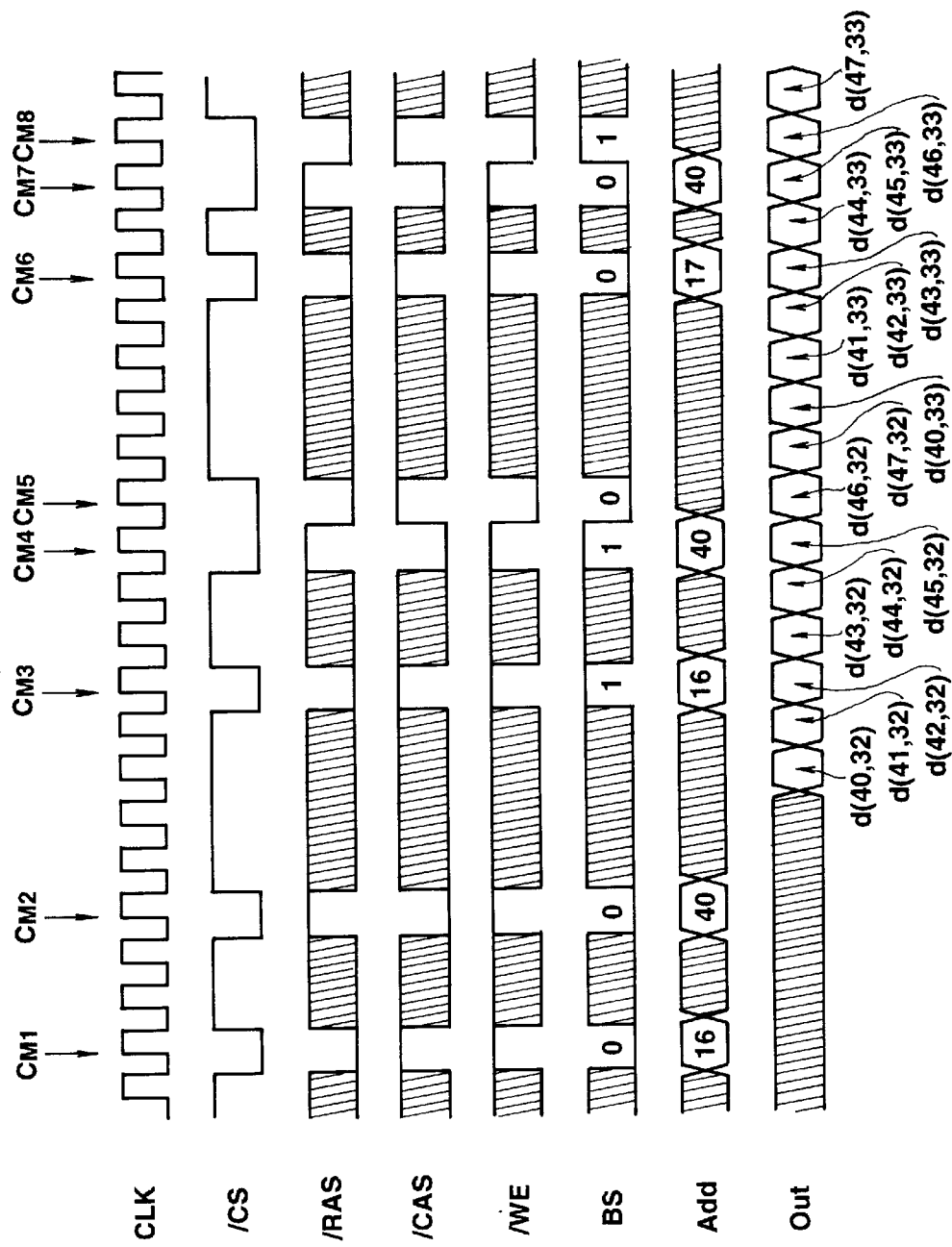
FIG. 10 is a timing chart for the SDRAM employing the address allocation shown in FIG. 9.

A timing chart for the SDRAM, corresponding to the address allocation shown in FIG. 9, is shown in FIG. 10. Banks 0 and 1 are employed, and "CLK", "/CS", "/RAS", "/CAS", "/WE", "BS", "Add" and "Out" are of the same meanings described in connection with FIG. 7 and hence are not explained herein. Referring to FIG. 10, if an L-level logical signal is supplied as "/CS", an L-level logical signal is supplied as "/RAS", an H-level logical signal is supplied as "/CAS" and an H-level logical signal is supplied as "/WE", and "BS" is set to "0", a command $C_{M1}$ is issued activating the bank 0 of the SDRAM of the chid selected by the logical signal "/CS". At this time, the row address is set to "16" by the logical signal "Add". The setting to "16" of the row address is made on the bank 0 and corresponds to the vertical address "32" of the picture image.

If an L-level logical signal is supplied as "/CS", an H-level logical signal is supplied as "/RAS", an L-level logical signal is supplied as "/CAS" and an H-level logical signal is supplied as "/WE", and "BS" is set to "0", a command CM2 is issued causing data of the bank 0 of the SDRAM of the chip selected by the logical signal "/CS" to be read out. At this time, the row address is set to "40" by the logical signal "Add". The setting to "40" of the column address is made on the bank 0 and corresponds to the horizontal address "40" of the picture image.

Then, "Out" outputs eight readout pulse data d(40, 32), . . . d(47, 32) after the sixth clock after setting the row address by the command $C_{M1}$. The reason the eight pulse data are outputted is that the burst length of continuous accessing during the burst transfer mode is pre-set to eight by the register. If an L-level logical signal is supplied as "/CS", an L-level logical signal is supplied as "/RAS", an H-level logical signal is supplied as "/CAS" and an H-level logical signal is supplied as "/WE", and "BS" is set to "1", a command $C_{M3}$ is issued activating the bank 0 of the SDRAM of the chip selected by the logical signal "/CS". At this time, the row address is set to "16" by the logical signal "Add". The setting to "16" of the row address is made on the bank 1 and corresponds to the vertical address "33" of the picture image.

If an L-level logical signal is supplied as "/CS", an H-level logical signal is supplied as "/RAS", an L-level logical signal is supplied as "/CAS" and an H-level logical signal is supplied as "/WE", and "BS" is set to "1", a command $C_{M4}$ is issued causing data of the bank 0 of the SDRAM of the chip selected by the logical signal "/CS" to be read. At this time, the column address is set to "40" by the logical signal "Add". The setting to "40" of the column address is made on the bank 0 and corresponds to the horizontal address "40" of the picture image.

Then, "Out" outputs eight readout pulse data d(40, 33), . . . d(47, 33) corresponding to the bank 1 at eight readout data d(40, 32) . . . (47, 32) corresponding to the bank 0. The reason the eight pulse data are outputted is that the burst length of continuous accessing during the burst transfer mode is pre-set to eight by the register. If an L-level logical signal is supplied as "/CS", an L-level logical signal is supplied as "/RAS", an H-level logical signal is supplied as "/CAS" and an L-level logical signal is supplied as "/WE", and "BS" is set to "0", a command $C_{M5}$ is issued to render the reading of the next row effective. This command $C_{M5}$, called a pre-charge command, is used for validating the accessing of different rows in the same bank, herein the bank 0.

For accessing a different row of the bank 0, the row address is set to "17" with the command $C_{M6}$, while the column address is set to "40" with the command $C_{M7}$. The setting of the row address to "17" corresponds to "34" of the vertical address of the picture image, while the setting of the column address to "40" corresponds to "40" of the horizontal address of the picture image. Then, "Out" outputs eight readout pulse data d(40, 33) . . . d(47, 33) while eight readout data are continuously outputted of the picture image corresponding to the different row of the bank 0, not shown. The command $C_{M8}$ is a pre-charge command of validating the readout of the different row in the bank 1.

Figure 11:
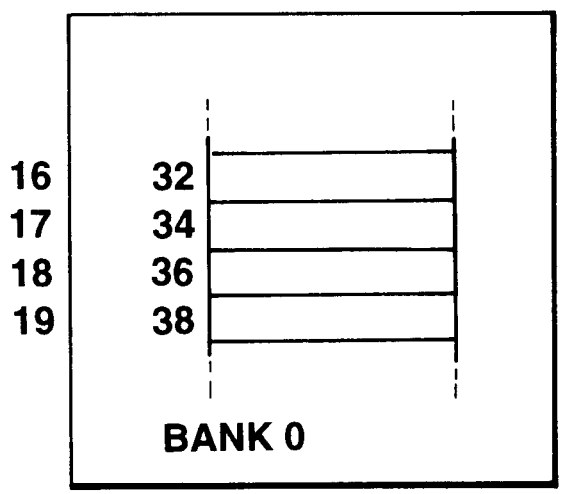
FIG. 11 illustrates data output for the concrete example of address location shown in FIG. 9.
Figure 11:
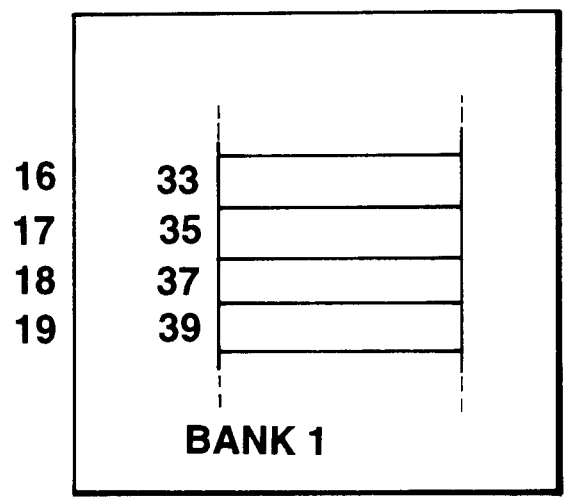

FIG. 11 illustrates data being outputted in accordance with the example of data allocation shown in FIG. 9. The data outputting mode is explained by referring to FIG. 6.

If the address allocation is made as shown in FIG. 9, data of even lines "32", "34", "36" and "38" of the picture image shown in FIG. 6, associated with the row addresses "16", "17", "18" and "19" of the bank 0 and data of odd lines "33", "35", "37" and "39" on the picture image shown in FIG. 6, associated with the row addresses "16", "17", "18" and "19" of the bank 1 are read out continuously and in alternation with each other.

That is, by setting the bank switching address bit BS so as to be within the BS allocation range and changing over the bank so that the numbers of the column address C and the horizontal address X coincide with each other, the setting of the row and column addresses of one of the banks may be set while data are read out from the other bank to enable data to be read out continuously.

Figure 12:
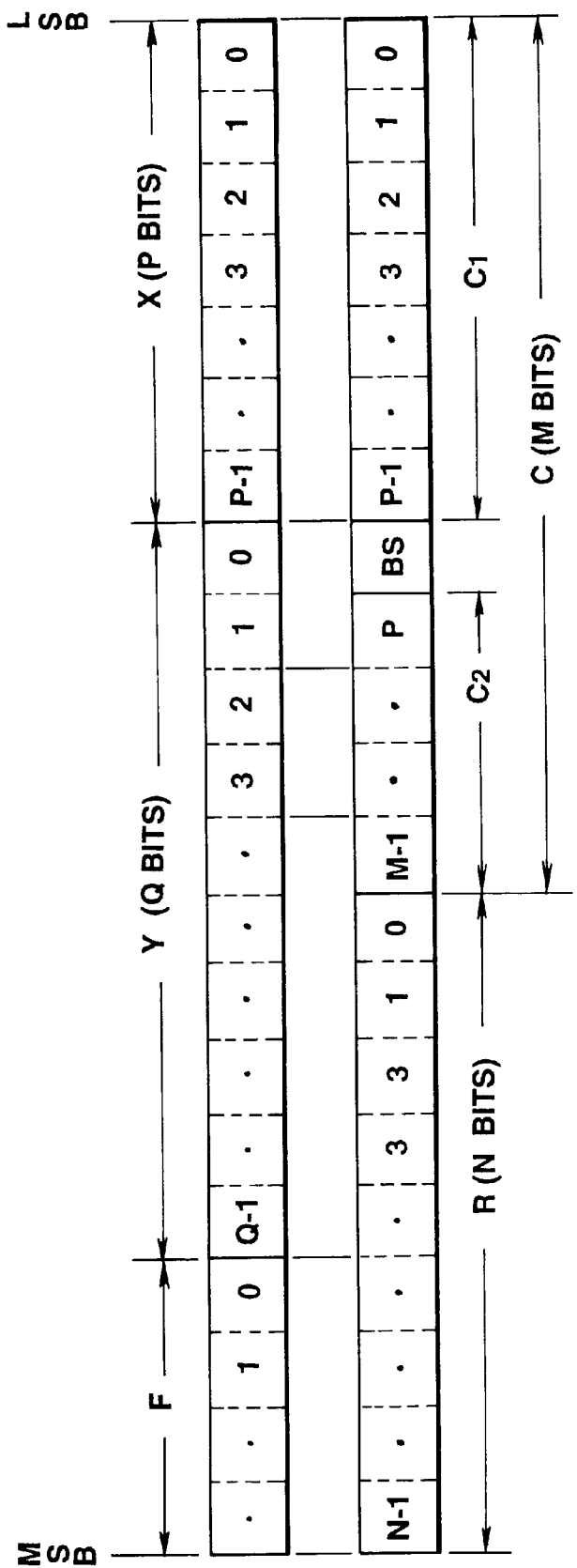
FIG. 12 illustrates a concrete example of address allocation shown in FIG. 8.

FIG. 12 shows an example in which the bank switching address bit BS is allocated to the lower most bit of the vertical address Y within the BS allocation range. The bank changeover address bit BS separates the column address into an upper order side address $C_2$ and a lower order side address $C_1$.

In FIG. 12, the addresses of the picture image are made up of horizontal addresses X (P bits) and vertical addresses (M bits) looking from the lower order side, while the addresses on the SDRAM are made up of column addresses (M bits) and row addresses (N bits), and the bank switching address BS is allocated at the lower most bit of the vertical address Y of the picture image. Thus the column address C is divided into a lower order column address $C_1$ (from 0 bit to (P−1)th bit, totalling P bits) and an upper order column address $C_2$ (from Pth bit to (M−1)th bit, totalling (M−P) bits). With such address allocation, the upper order side column address $C_2$=(M−P) bits are allocated to the lower order bits, exclusive of the LSB, of the vertical address Y of the picture image. If the (M−P) bits of the upper order column address $C_2$ are 2 bits, the column address on the SDRAM is divided into $2^{(M-P)} = 2^2 = 4$.

Figure 13:
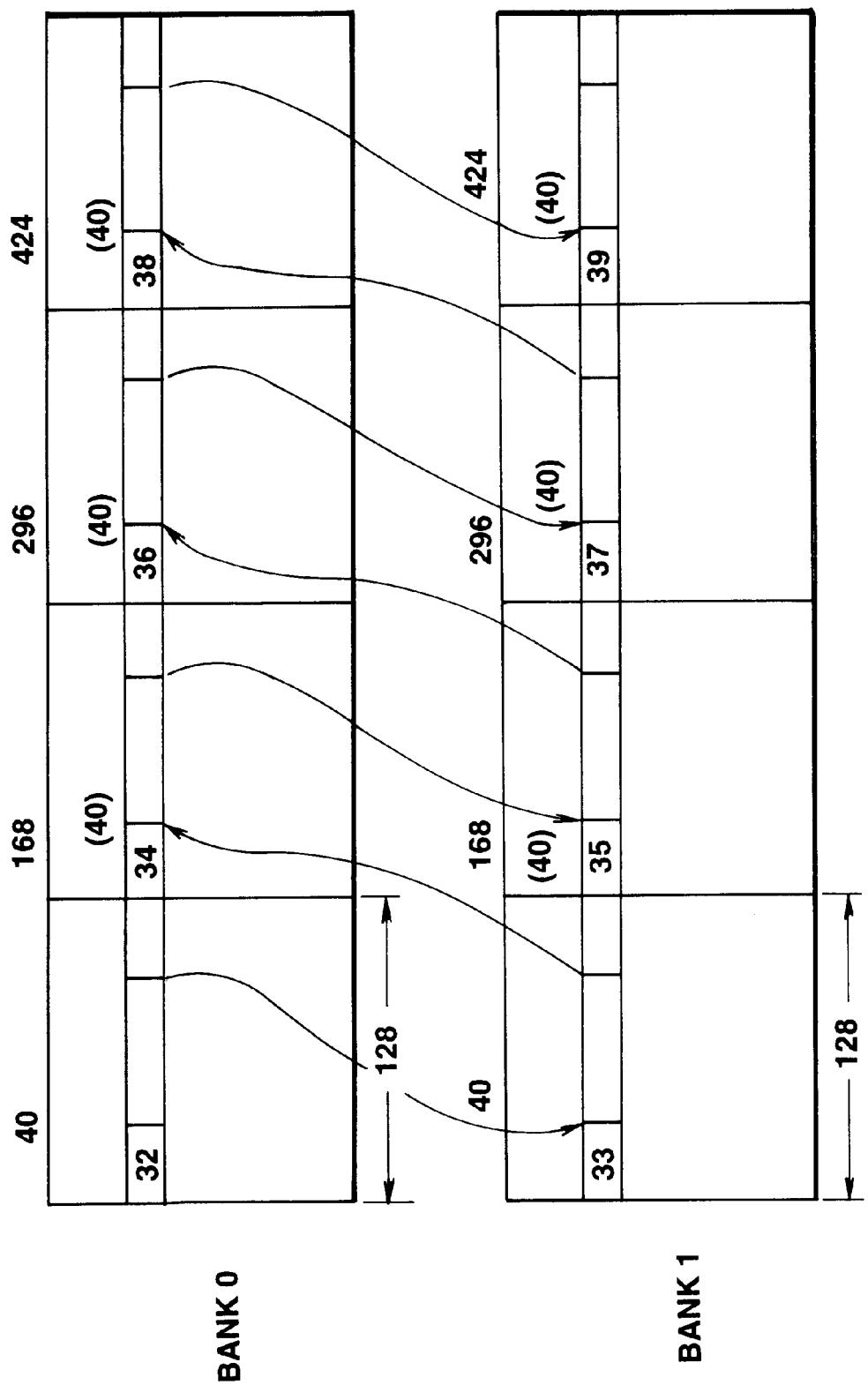
FIG. 13 illustrates data output for the concrete example of address location shown in FIG. 12.

Then the data corresponding to the vertical addresses "32", "34", "36" and "38" of the bank 0 shown in FIG. 13 and the data corresponding to the vertical addresses "33", "35", "37" and "39" of the bank 1 shown in FIG. 13 are read out in the sequence of "32", "33", "34", "35", "36", "37", "38" and "39" by bank switching. Meanwhile, in FIG. 13, the transverse length of the four sub-regions resulting from the division, is set to 128 for simplifying the drawing and the explanation. In such case, the number of bits P of the lower order side column address $C_1$ is 7 (P=7), that is $2^P$=7.

That is, with the method shown in FIG. 12, the row and column addresses of a line "33" of one of the banks may be set by bank switching during the time when the data for the line "32" of the picture image shown in FIG. 6 is read, so that the data of the picture image shown in FIG. 6 may be continuously read in the sequence of "32", "33", "34", "35", "36", "37", "38" and "39".

Figure 14:
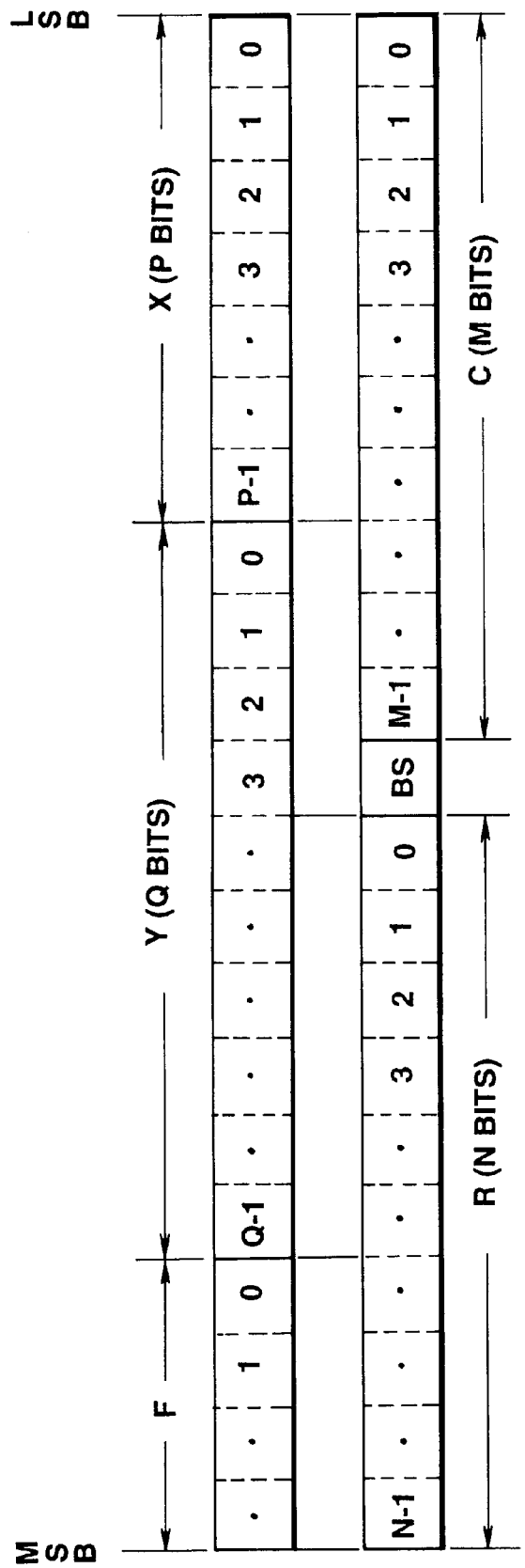
FIG. 14 illustrates another concrete example of address allocation shown in FIG. 8.

FIG. 14 shows an example in which the bank switching address bit BS is allocated at a lower order side than the LSB of the row address R within the BS allocation range. In FIG. 14, the addresses of the picture image are the horizontal address X of P bits and the vertical address Y of Q bits, looking from the lower order side, while the address on the SDRAM is the column address of M bits and the row address of N bits, looking from the lower order side.

Figure 15:
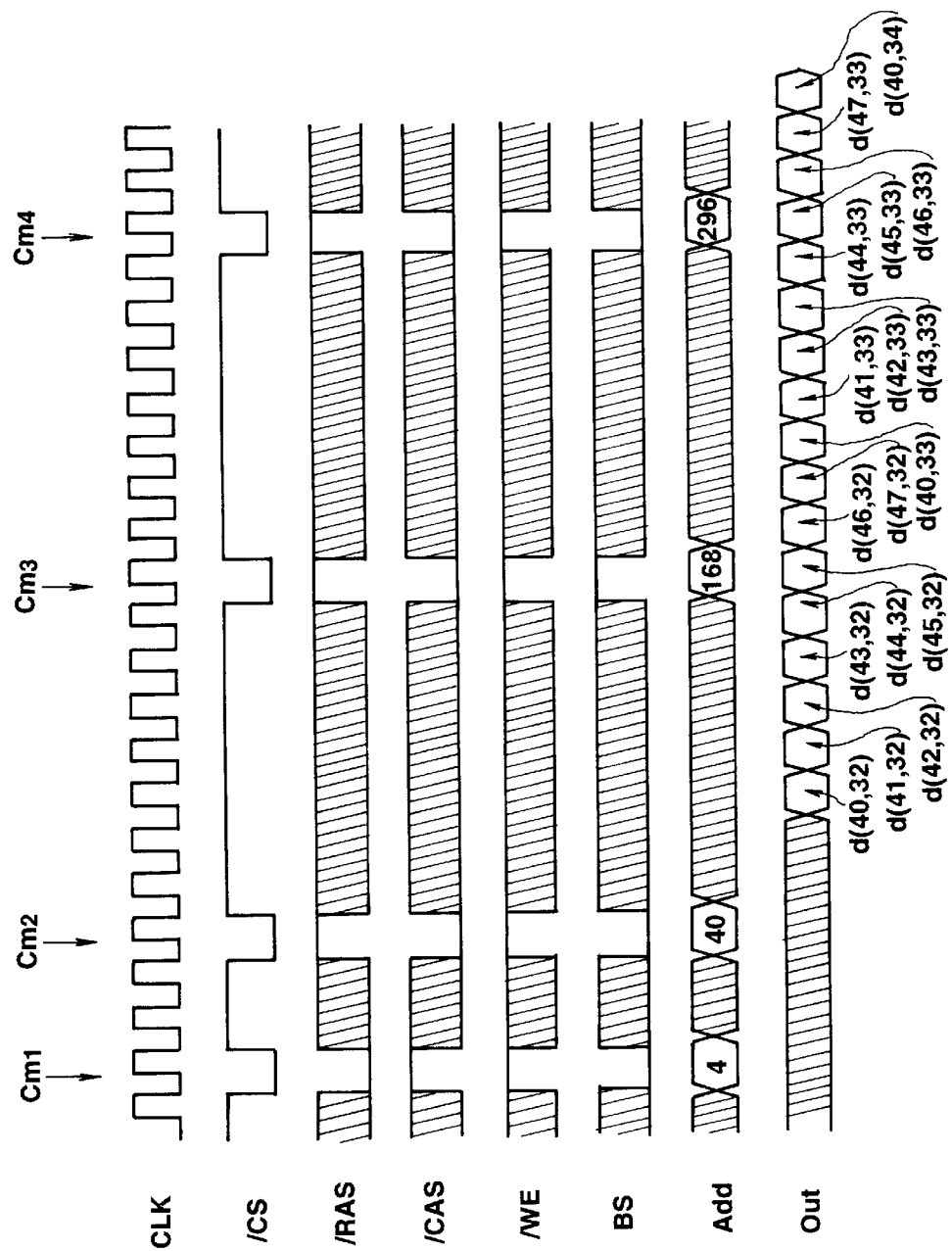
FIG. 15 is a timing chart for the SDRAM employing the address allocation shown in FIG. 14.

FIG. 15 shows a timing chart of the SDRAM associated with the example of address allocation shown in FIG. 14. Although the banks 0 and 1 are employed herein, only the timing for the bank 0 is shown for simplicity of the explanation. The readout timing is explained by referring to FIG. 6.

In FIG. 15, "CLK", "/CS", "/RAS", "/CAS", "/WE", "BS", "Add" and "Out" are of the same meanings described in connection with FIG. 7 and hence are not explained herein. If, in FIG. 15, an L-level signal is supplied as a logical signal "/CS", an L-level logical signal is supplied as a logical signal "/RAS", an H-level logical signal is supplied as a logical signal "/CAS" and an H-level logical signal is supplied as a logical signal "/WE", and a logical signal "BS" is set to "0", a command $C_{m1}$ is issued activating the bank 0 of the SDRAM of the chip selected with the logical signal "/CS". The row address is set at this time to "4" by the logical signal "Add". The setting on the row address is that for the bank 0 and corresponds to the vertical address "32" on the picture image shown in FIG. 6.

If an L-level signal is supplied as a logical signal "/CS", an H-level logical signal is supplied as a logical signal "/RAS", an L-level logical signal is supplied as a logical signal "/CAS" and an H-level logical signal is supplied as a logical signal "/WE", and a logical signal "BS" is set to "0", a command $C_{m2}$ is issued causing data of the bank 0 of the SDRAM of the chip selected with the logical signal "/CS" to be read out. The column address is set at this time to "40" by the logical signal "Add". This setting on the column address is that for the bank 0 and corresponds to the horizontal address "32" of the picture image shown in FIG. 6.

Then, "Out" outputs eight readout pulse data d(40, 32), . . . d(47, 32) after the sixth clock after setting the row address by the command $C_{M1}$. The reason the eight pulse data are outputted is that the burst length of continuous accessing during the burst transfer mode is pre-set to eight by the register. If an L-level signal is supplied as a logical signal "/CS", an H-level logical signal is supplied as a logical signal "/RAS", an L-level logical signal is supplied as a logical signal "/CAS" and an H-level logical signal is supplied as a logical signal "/WE", and a logical signal "BS" is set to "0", a command $C_{m3}$ is issued for activating the bank 0 of the SDRAM of the chip selected with the logical signal "/CS". The column address is set at this time to "168" by the logical signal "Add". This setting on the column address is that for the bank 0 and corresponds to the horizontal address "40" of the picture image shown in FIG. 6.

Then, "Out" causes the next eight readout data d(40, 33) . . . d(47, 33) of the same row of the bank 0 to be outputted in succession to the previous eight readout data d(40, 33) . . . d(47, 32). The reason the eight pulse data are outputted is that the burst length of continuous accessing during the burst transfer mode is pre-set to eight by the register. If an L-level signal is supplied as a logical signal "/CS", an H-level logical signal is supplied as a logical signal "/RAS", an L-level logical signal is supplied as a logical signal "/CAS" and an H-level logical signal is supplied as a logical signal "/WE", and a logical signal "BS" is set to "0", a command Cm4 is issued for activating the bank 0 of the SDRAM of the chip selected with the logical signal "/CS". The column address is set at this time to "296" by the logical signal "Add". This setting on the column address is that for the bank 0 and corresponds to the horizontal address "40" of the picture image shown in FIG. 6.

Then, "Out" causes the next eight readout data d(40, 34) . . . of the same row of the bank 0 to be outputted in succession to the previous eight readout data d(40, 33) . . . d(47, 33). The reason the eight pulse data are outputted is that the burst length of continuous accessing during the burst transfer mode is pre-set to eight by the register.

Figure 16:
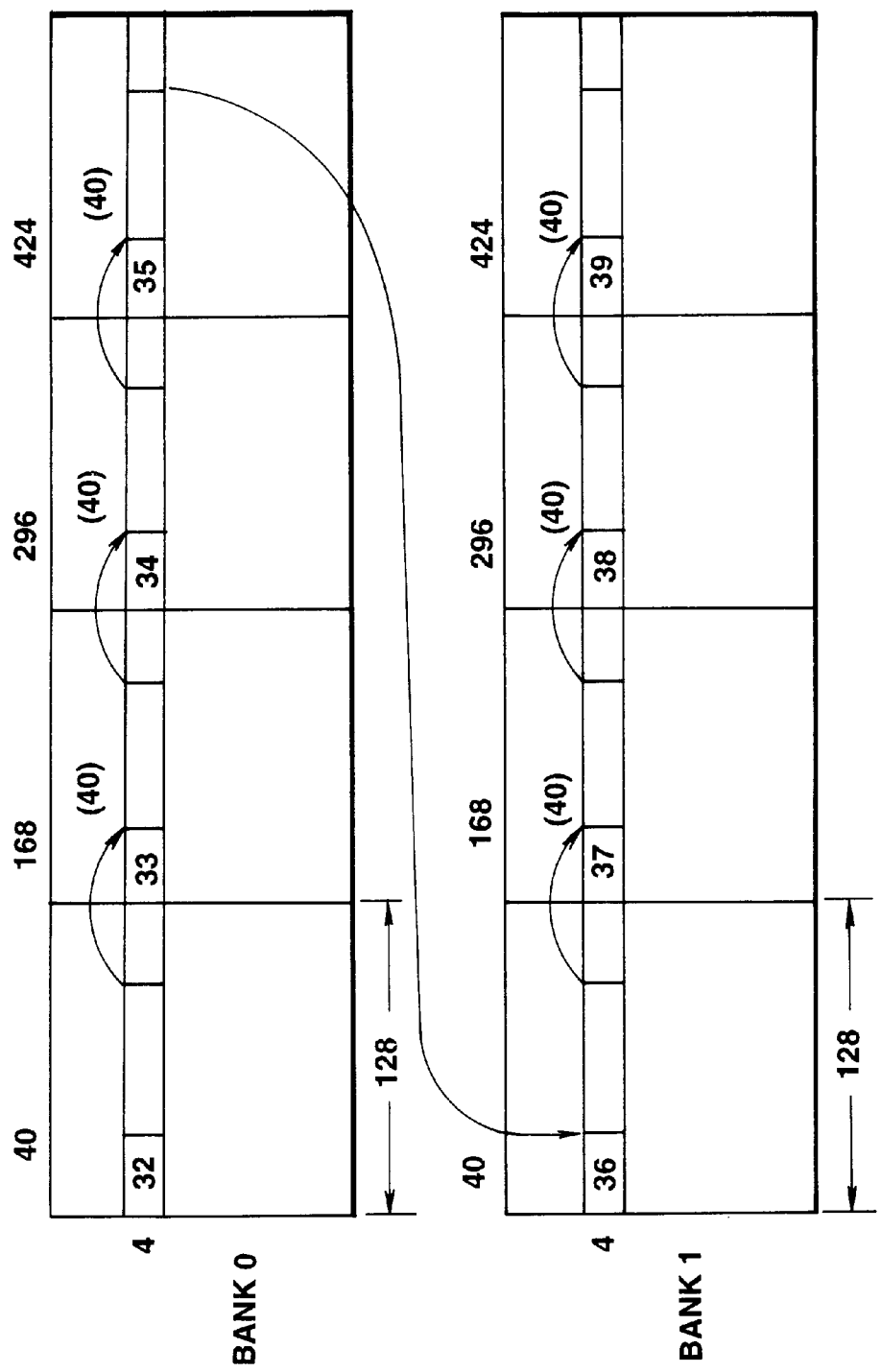
FIG. 16 illustrates data output for the concrete example of address location shown in FIG. 14.

FIG. 16 shows data being outputted for the example of address allocation shown in FIG. 14. In FIG. 16, the transverse length of each of the sub-regions resulting from the division by four, is set to 128, as in the case of FIG. 13.

If the upper two bits of the column addresses C and the one bit of the bank switching address are employed, and the row address of the bank 0 shown in FIG. 16 is set to "4", the data of the picture image may be read for four lines of "32", "33", "34" and "35" as the data for the row address "4" of the bank 0. On the other hand, the data of the picture image may be read for four lines of the vertical addresses "36", "37", "38" and "39" as the data for the row address "4" of the bank 1.

That is, with the example of address allocation shown in FIG. 14, the four lines of the vertical addresses "32", "33", "34" and "35" of the picture image are read out in association with the column addresses "40", "168", "296" and "424" for the same row address "4" of the bank 0. If the bank is switched to the bank 1, as shown in FIG. 16, the four lines of the vertical addresses "36", "37", "38" and "39" of the picture image are read out in association with the column addresses "40", "168", "296" and "424" for the same row address "4" of the bank 1.

Thus, when accessing the same row of the same bank, interruption in the data outputting may be eliminated to realize continuous readout by taking advantage of the feature that continuous accessing may be made on the clock basis by controlling the input timing of the column addresses even though the column addresses are not continuous.

With the above-described embodiment, a synchronous DRAM, in which each of two banks is accessed by the common row and column addresses and each bank is designated by the bank switching address, is employed as the frame memory 20 of the picture memory, and the bank switching address is allocated so as to be on the lower order side of at least the row address and on the higher order side of the horizontal address of the picture image, so that picture data may be read continuously at an elevated rate.

It is to be noted that the moving picture decoding device according to the present invention is not limited to the above described embodiments. For example, the bank switching bit BS may be located at any position within the BS allocation range.

Although the present invention has been shown and described with respect to preferred embodiments, various changes and modifications which are obvious to a person skilled in the art to which the invention pertains are deemed to lie within the spirit and scope of the invention as claimed.

What is claimed is:

1. A moving picture decoding device for decoding a moving picture by writing and reading picture data to and from a picture memory, wherein the improvement comprises:

a synchronous dynamic random access memory used as the picture memory, wherein the synchronous dynamic random access memory has a plurality of banks, each of the banks is accessed by a common column address and a common row address, each bank designated by a bank switching address, each predetermined length of the picture data is written into only one of the plurality of banks, and the picture data is continuously read from the plurality of banks in alternation.

2. The moving picture decoding device of claim 1, wherein, when a horizontal address and a vertical address of a picture image are arrayed at lower (least significant bit) and upper (most significant bit) order sides, respectively, and allocated to a lower order side column address and an upper order side row address of the synchronous dynamic random access memory respectively, a bank switching address is allocated between an upper most bit of the horizontal address and a lower most bit of the row address.

3. The moving picture decoding device of claim 1, wherein, when a horizontal address and a vertical address of a picture image are arrayed at lower (least significant bit) and upper (most significant bit) order sides, respectively, and allocated to lower order side column addresses and upper order side row addresses of the synchronous dynamic random access memory respectively, a bank switching address is allocated between the common column address and the common row address.

4. The moving picture decoding device of claim 1, wherein, when a horizontal address and a vertical address of a picture image are arrayed at lower (least significant bit) and upper (most significant bit) order sides, respectively, and allocated to lower order side column addresses and upper order side row addresses of the synchronous dynamic random access memory, respectively, a bank switching address is allocated to a lower most bit of the vertical address.

5. The moving picture decoding device of claim 1, wherein the picture memory comprises:

a one-chip frame memory.

6. A moving picture decoding device, comprising:

inverse variable length decoding means supplied with an encoded input image data signal for generating decoded data, including motion vector data for motion compensation;

a motion compensation circuit, supplied with the motion vector data, for compensating image motion within the input image data signal and generating motion-compensated picture data and a readout address for a motion compensation block of data in the picture memory based on the motion vector data;

a picture memory, the picture memory including a synchronous dynamic random access memory having a plurality of banks, each of the banks accessed by a common column address and a common row address, each bank designated by a bank switching address; and a memory control unit, supplied with the readout address, for separately writing each predetermined length of data of the motion compensation block into only one of the plurality of banks, and for continuously reading out data of the motion compensation block from the plurality of banks in alternation in accordance with the readout address and transmitting the read out data of the motion compensation block to the motion compensation circuit.

7. The moving picture decoding device of claim 6, further comprising:

an additive node supplied with said motion-compensated picture data from the motion compensation circuit;

inverse quantization means, supplied with the decoded data from the inverse variable length decoding means, for generating inverse quantized data; and inverse discrete cosine transforming means for inverse discrete cosine transforming the inverse quantized data and supplying inverse discrete cosine transformed data to the additive node so that addition output data is generated at the additive node which is the sum of the inverse discrete cosine transformed data and the motion-compensated picture data.

8. The moving picture decoding device of claim 6, further comprising:

a write address counter;

a display address counter;

an output terminal; and a display buffer memory, wherein the addition output data from the additive node is supplied to the picture memory so as to be written in locations designated by addresses supplied from the write address counter;

the write address counter is supplied with the addition output data from the additive node and counts up each time the addition output data is outputted from the additive node; and picture data written in the picture memory is read out in accordance with addresses transmitted from the display address counter to the memory control unit, and is outputted at the output terminal via the display buffer memory.

* * * * *